United States Patent
Jung et al.

(10) Patent No.: US 11,262,278 B2
(45) Date of Patent: Mar. 1, 2022

(54) SYSTEM AND METHOD FOR AN INNER DOOR HANDLE TEST FIXTURE

(71) Applicant: Honda Motor Co., Ltd., Tokyo (JP)

(72) Inventors: Sunho Jung, Dublin, OH (US); Nicholas Alfred Khayata, Pell City, AL (US)

(73) Assignee: HONDA MOTOR CO., LTD., Tokyo (JP)

( * ) Notice: Subject to any disclaimer, the term of this patent is extended or adjusted under 35 U.S.C. 154(b) by 172 days.

(21) Appl. No.: 16/793,036

(22) Filed: Feb. 18, 2020

(65) Prior Publication Data

US 2021/0255065 A1 Aug. 19, 2021

(51) Int. Cl.
*G01M 99/00* (2011.01)
*G01L 5/00* (2006.01)

(52) U.S. Cl.
CPC ......... *G01M 99/007* (2013.01); *G01L 5/0028* (2013.01); *G01M 99/008* (2013.01)

(58) Field of Classification Search
CPC .. G01M 99/007; G01M 99/008; G01L 5/0028
See application file for complete search history.

(56) References Cited

U.S. PATENT DOCUMENTS

| | | | |
|---|---|---|---|
| 5,007,668 A * | 4/1991 | Di Giusto | E05B 83/36 292/216 |
| 5,641,918 A * | 6/1997 | Odenwald | G01M 99/008 73/862.01 |
| 5,920,191 A | 7/1999 | Maniero et al. | |
| 5,936,167 A * | 8/1999 | Kulig | G01M 99/008 73/865.6 |
| 6,021,366 A | 2/2000 | Fieramosca et al. | |
| 6,246,225 B1 | 6/2001 | Schaefer | |
| 6,425,300 B1 * | 7/2002 | Seo | G01M 99/008 73/865.9 |
| 10,458,884 B2 * | 10/2019 | Torres Salvador | G01M 99/008 |
| 2016/0202302 A1 | 7/2016 | Cooper et al. | |
| 2018/0144562 A1 | 5/2018 | Haro | |
| 2019/0003946 A1 * | 1/2019 | Weinhold | G01N 3/56 |

FOREIGN PATENT DOCUMENTS

| | | | |
|---|---|---|---|
| CN | 202631238 U | * | 12/2012 |
| CN | 209961130 U | * | 1/2020 |
| CN | 213051583 U | * | 4/2021 |
| CN | 213301071 U | * | 5/2021 |
| CN | 213812091 U | * | 7/2021 |
| KR | 101348957 B1 | | 1/2014 |

* cited by examiner

*Primary Examiner* — Natalie Huls
(74) *Attorney, Agent, or Firm* — Armstrong Teasdale LLP

(57) ABSTRACT

A method and system for an assembly test fixture includes a first surface of the assembly test fixture matingly complementary to a second surface of a component to be tested. The assembly test fixture also includes a plurality of proximity detection features on the first surface configured to detect a predetermined proper alignment of one or more actuating cables of the component to be tested with respect to a second surface of the component to be tested. The assembly test fixture further including a conduit internal to the assembly test fixture configured to provide electrical continuity indicating the predetermined proper alignment and a connector pluggable to a test device capable of indicating proper operation of the component to be tested.

7 Claims, 6 Drawing Sheets

SYSTEM AND METHOD FOR AN INNER DOOR HANDLE TEST FIXTURE

BACKGROUND

During vehicle manufacturing, it is necessary to conduct various tests of the newly assembled vehicle components to ensure that the components operate satisfactorily. Among the quality assurance tests conducted during vehicle manufacturing is testing of the vehicle's electrical system.

In existing vehicle assembly plants, some components are partially assembled and tested before being assembled to the vehicle. In such cases, testing electrical components may require supplying power to the component to verify proper operation. However, without the vehicle battery available to power the component during testing and certain mechanical fit-up features also not being available until the component is assembled to the vehicle, separate connections must be made. These connections may not be able to test the component for proper fit and seating, nor for proper operation when the circuit is completed as if installed on the vehicle. Because a technician can only have seconds to perform a check on the component, it is important that any test fixture be compact, simple, fast, self-powered, and the testing be complete for the function being tested.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, an assembly test fixture includes a first surface matingly complementary to a second surface of a component to be tested and a plurality of proximity detection features on the first surface configured to detect a predetermined proper alignment of one or more actuating cables of the component to be tested with respect to the second surface of the component to be tested. Assembly test fixture further includes a connector pluggable to a test device capable of indicating a proper assembly of the component to be tested, wherein the plurality of proximity detection features includes at least one electrical contact configured to engage the one or more actuating cables to complete an electric circuit of the assembly test fixture that enables supply of power to the test device.

In another aspect, a method of verifying operation of a component to be tested includes coupling a connector of an assembly test fixture to a test device capable of indicating proper operation of the component to be tested, mating a first surface of an assembly test fixture to a complementary a second surface of a component to be tested including one or more actuating cables, and verifying proper mating of the first surface and the second surface using an indicating device including at least one of a visual indicating device, an aural indicating device, and a tactile indicating device. The method also includes actuating the assembly test fixture and observing a predetermined proper operation of the test device and advancing the test device along an assembly line to a next sequential station based on the observing the predetermined proper operation of the test device.

In yet another aspect, an assembly line includes a conveyor for moving an assembly from a first point to a second point along the assembly line and a hand-held assembly test fixture that includes a first surface matingly complementary to a second surface of a component to be tested, the component to be tested including one or more actuating cables, a plurality of proximity detection features extending from or into the first surface, and a connector pluggable to a test device capable of indicating proper assembly of the component to be tested. The plurality of proximity detection features includes at least one electrical contact configured to engage the one or more actuating cables to complete an electric circuit of the assembly test fixture that enables supply of power to the test device.

Various refinements exist of the features noted above in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE DRAWINGS

FIG. 1 is a perspective view of an assembly test fixture in accordance with an example embodiment of the present disclosure.

FIG. 2 is a perspective view of a first surface of the assembly test fixture shown in FIG. 1 with a door handle actuating cable and door lock rod engaged to electrical contacts of respective proximity detection features.

FIG. 3 is a perspective view of a component to be tested engaged to the first surface and viewed from the opposite end of the assembly test fixture than shown in FIG. 2.

FIG. 4 is a perspective view of the component to be tested engaged to the first surface.

FIG. 5 is a perspective view of the test device actuating, in that a window of the vehicle door is indicated going up, which indicates a successful test.

FIG. 6 is a flowchart of an example method of verifying operation of the component to be tested.

Figure 1:
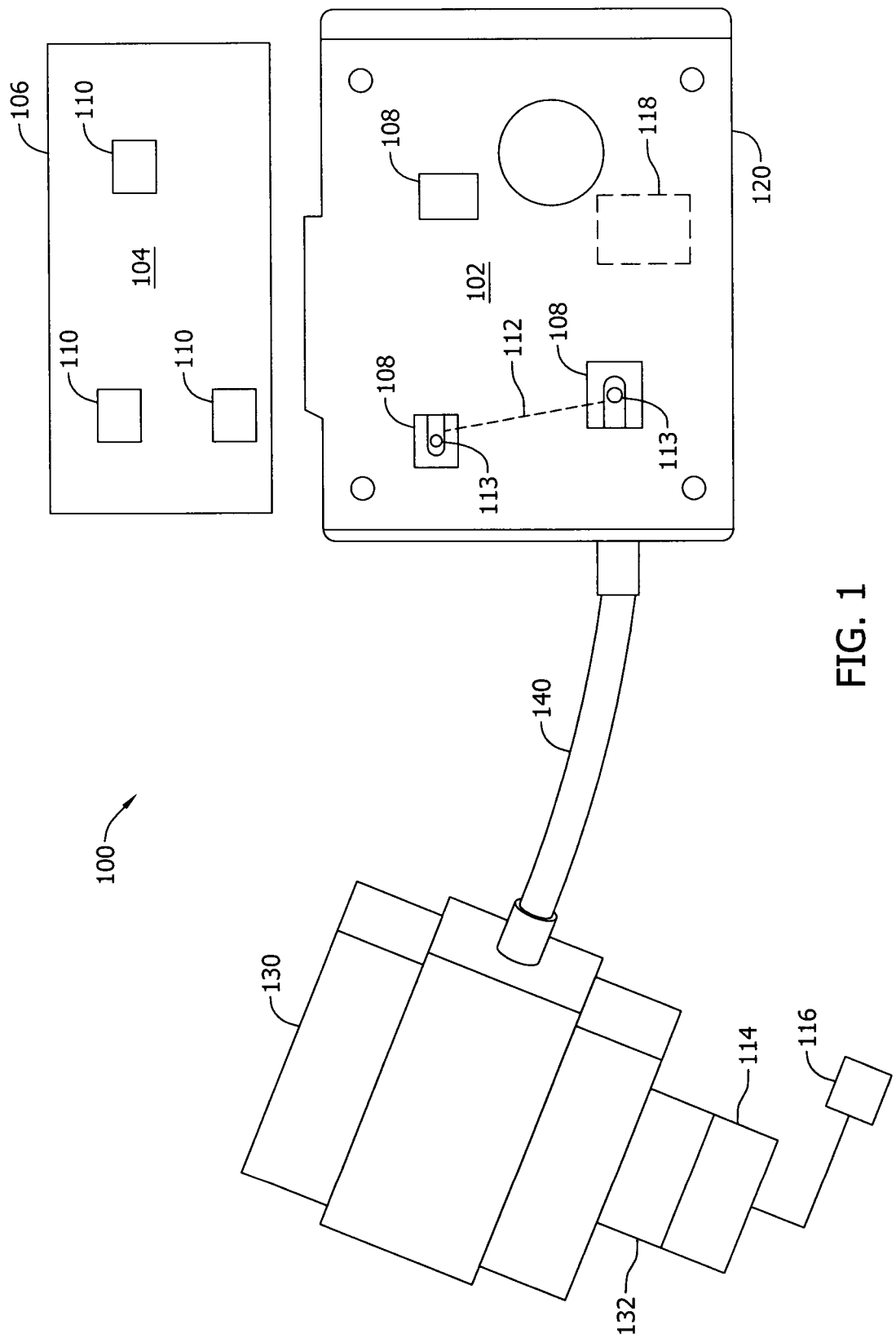
FIGS. 1-6 show example embodiments of the method and system described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to testing components during an assembly process.

Embodiments of an assembly test fixture and method of operating the assembly test fixture are described herein. The assembly test fixture is configured to reproduce the interfaces to the component to be tested and operate a test device that indicates a successful test by the assembly test fixture. One such test verifies proper alignment of the actuating cables of the door handle. The disclosed assembly test fixture ensures the inner handle actuating cables are properly set and are not soft-set or mis-set. The assembly test fixture includes a plurality of pins/sensors (i.e. proximity sensors) that completes an electric circuit when they engage properly aligned actuating cables of the door handle. The assembly test fixture also includes a first surface that is matingly complementary to a second surface of a component to be tested. The assembly test fixture also includes a plurality of proximity detection features extending from or into the first surface. In various embodiments, the plurality of proximity detection features includes pins, protrusions, sockets, and/or recesses configured to engage complementary features on the component to be tested. For example, the first surface may have pins or protrusions extending away from the first surface whereas the second surface may include sockets or recesses configured to accept the pins and protrusions. In another example, first surface and second surface may have combinations of pins, protrusions, sockets, recesses configured to engage each other for conducting the test.

The assembly test fixture further includes a conduit internal to the assembly test fixture configured to provide electrical continuity to an indicator when the actuating cables associated with the inner door handle are detected as being properly aligned and not soft-set or mis-set. The assembly test fixture also includes a connector or port pluggable to a test device capable of indicating proper operation of the component to be tested. In the example embodiment, an inner door handle for a vehicle is the component to be tested. The assembly test fixture uses a window actuator or motor of a window in the door and the window as the test device to verify the inner door handle and associated handle function mechanisms, such as actuating cables and lock rods, are installed properly.

The following description refers to the accompanying drawings, in which, in the absence of a contrary representation, the same numbers in different drawings represent similar elements.

FIG. 1 is a perspective view of an assembly test fixture 100 in accordance with an example embodiment of the present disclosure. In the example embodiment, assembly test fixture 100 includes a first element 120 attached to a second element 130 by an electrical cable 140. The first element 120 is configured to be connected to a component to be tested 106 and the second element 130 is configured to be connected to a test device 116 capable of indicating proper operation of the component to be tested 106. In other embodiments, the second element 130 may be directly fastened to the first element 120 alleviating the need for the electrical cable 140. In an exemplary embodiment, the component to be tested 106 may be an inner door handle for a door of a vehicle, and the test device 116 may include a window actuator or motor of a window in the door of the vehicle.

In the example embodiment, the first element 120 includes a first surface 102 matingly complementary to a second surface 104 of the component to be tested 106. A plurality of proximity detection features 108 extend from or into the first surface 102. The proximity detection features 108 are configured to determine the proper alignment of the inner door handle and associated handle function mechanisms, such as actuating cables and lock rods. The plurality of proximity detection features 108 engage complementary detection features 110 on the component to be tested 106 and the inner door handle and associated handle function mechanisms. A conduit 112 internal to the first element 120 is configured to provide electrical continuity to an indicator. The second element 130 includes at least one port 132 that may be coupled to at least one connector 114 associated with the test device 116 capable of indicating proper operation of the component to be tested 106.

The assembly test fixture 100 also includes an internal battery 118 located within the first element 120. In other embodiments, the battery 118 may be located within the second element 130. The battery 118 is configured to supply power to the assembly test fixture 100 and the test device 116 when the component to be tested 106 and the test device 116 are connected to the assembly test fixture 100. The assembly test fixture 100 may then operate the test device 116 to verify that the component to be tested 106 and its associated mechanisms are installed properly. In an exemplary embodiment, the assembly test fixture 100 may supply power and operate the window actuator or motor of the window in the door to verify the inner door handle and associated handle function mechanisms, such as actuating cables and rods, are installed properly.

Figure 2:
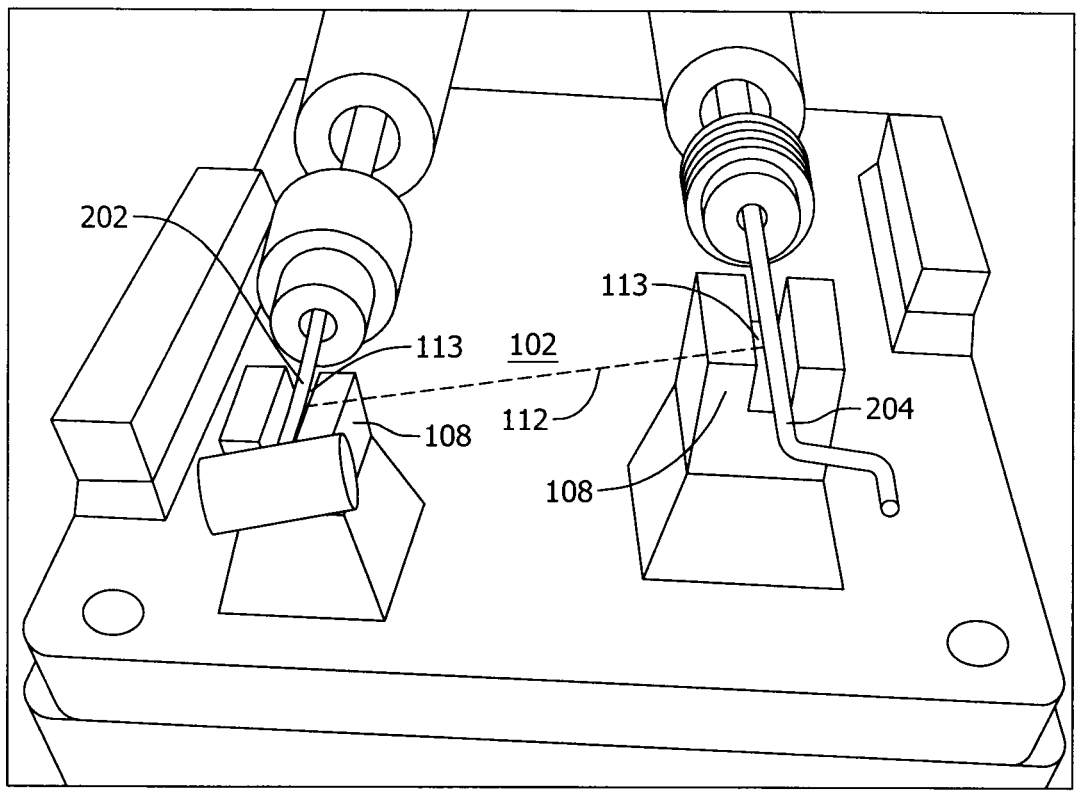

FIG. 2 is a perspective view of the first surface 102 with a door lock actuating cable 202 and a door handle actuating cable 204 of the component to be tested 106 engaged to electrical switches 113 of the respective proximity detection features 108. This view shows the door lock actuating cable 202 and the door handle actuating cable 204 without the second surface 104 of the component to be tested 106 installed for clarity. When the component to be tested 106 mates with the first surface 102 of the first element 120, the component to be tested 106 pushes down the door lock actuating cable 202 and the door handle actuating cable, 204 to actuate the electrical switches 113, which completes an internal circuit via conduit 112 enabling the battery 118 to supply power to the test device 116 and allowing the test device 116 to operate.

During operation, the first surface 102 and the second surface 104 are mated face-to-face and pressed together. If the door lock actuating cable 202 and the door handle actuating cable 204 are positioned correctly in the inner door handle of the door of the vehicle, the door lock actuating cable 202 and the door handle actuating cable 204 align with proximity detection features 108 to push down respective electrical switches 113. When pushed down, the electrical switches 113 complete the internal circuit enabling the battery 118 to supply power to the test device 116, which is embodied in a window actuator or motor, allowing the window (shown in FIG. 5) to be rolled up or rolled down. If the door lock actuating cable 202 and the door handle actuating cable 204 are not positioned correctly in the inner door handle of the door of the vehicle, the door lock actuating cable 202 and the door handle actuating cable 204 are not able to contact the lock cable contact and the handle cable contact (mis-fit) or are not able to push down respective electrical switches 113 (soft-fit).

Figure 3:
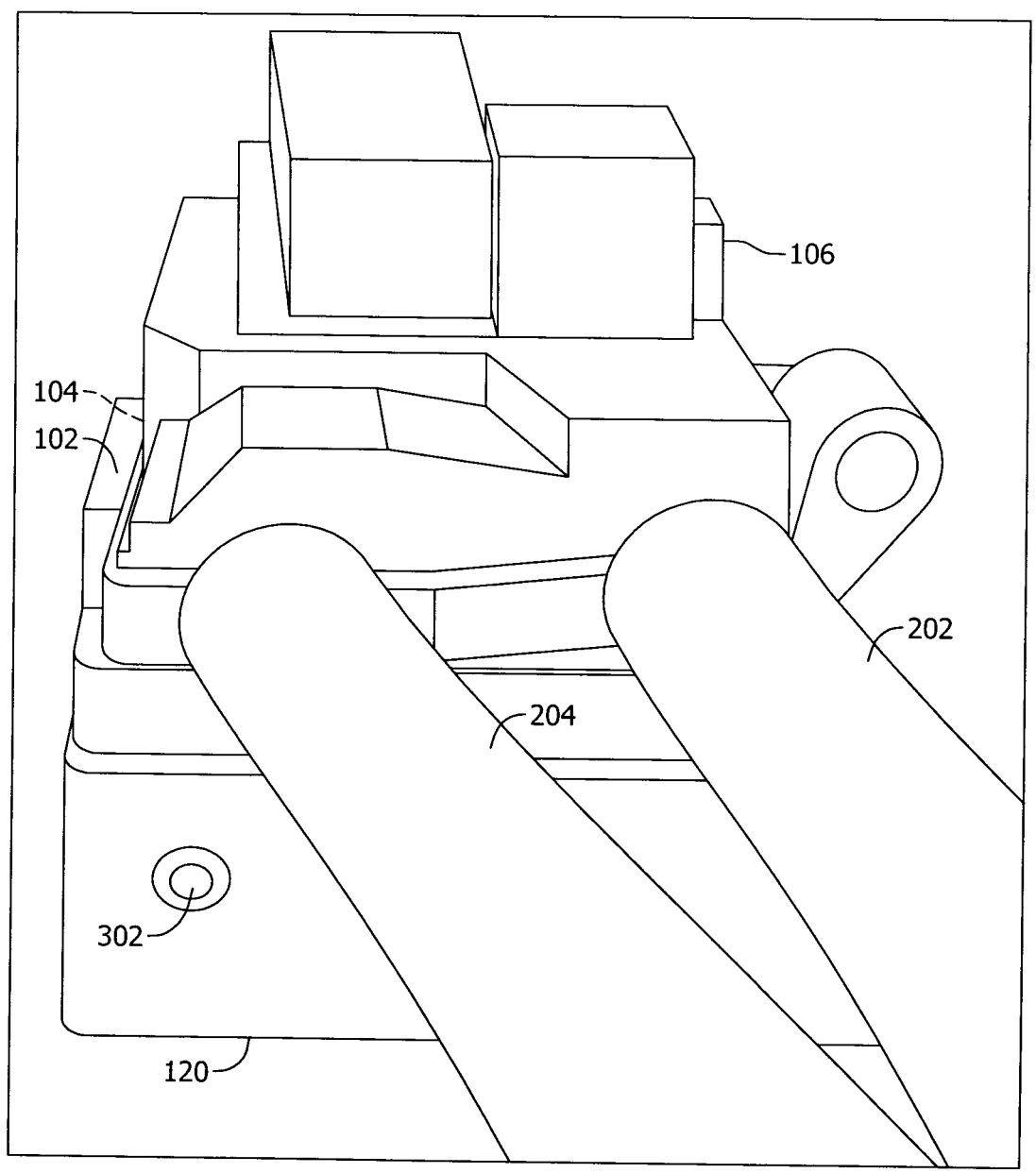

FIG. 3 is a perspective view of the component to be tested 106 engaged to the first surface 102 of the first element 120 and viewed from the opposite end of the assembly test fixture 100 than shown in FIG. 2. Proper alignment and continuity are verified using an indicating device 302, in this embodiment, an indicating light. Failure of the indicating device 302 to provide the indicating light indicates a problem of the component to be tested 106 that needs to be corrected before the component to be tested 106 can advance on the assembly line. In an exemplary embodiment, when the component to be tested 106 is an inner door handle, failure of the indicating device 302 to provide the indicating light may indicate a problem with an inner door handle function mechanism, such as an actuating cable or rod, that is not installed properly. In other embodiments, the indicating device 302 may include any suitable indicating device that enables the assembly test fixture 100 to function as described herein including, for example and without limitation, an aural indicating device, such as a speaker.

Figure 4:
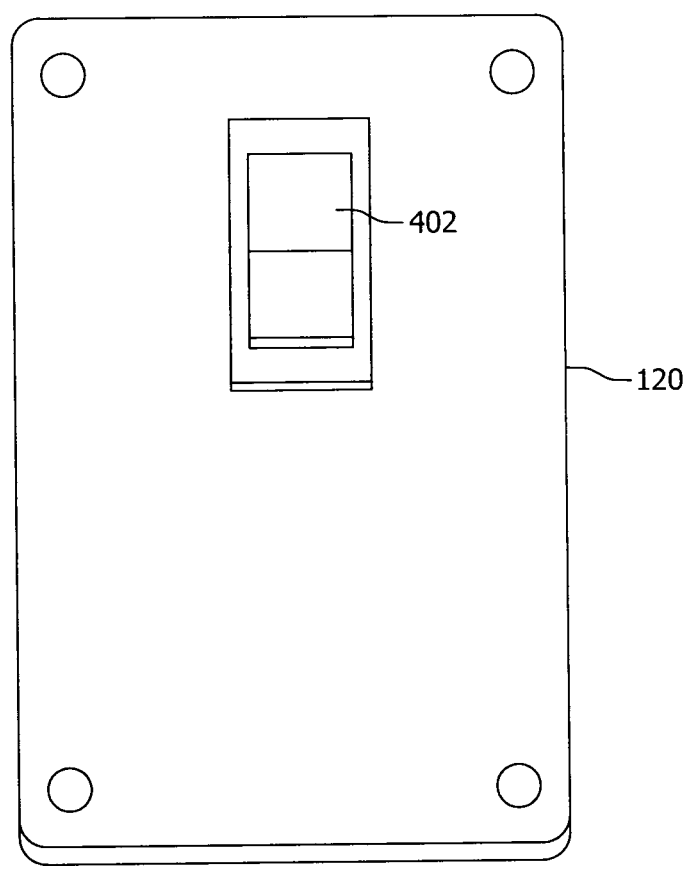

FIG. 4 is a perspective view of the first element 120 viewed from an opposite side of the assembly test fixture 100 than shown in FIG. 1. In the example embodiment, the first element 120 may also include at least one switch 402 configured to operate the test device 116 when the component to be tested 106 and the test device 116 are connected to the assembly test fixture 100. When the indicating device 302 indicates proper alignment and continuity (e.g., by illuminating if a light, or sounding if an aural indictor), the switch 402 is actuated by a user, causing the test device 116 to operate. Failure of the switch 402 to properly actuate or operate the test device 116 indicates a problem with the component to be tested 106 that needs to be corrected before the component to be tested 106 can advance on the assembly line. In other embodiments, failure of the switch 402 to properly operate the test device 116 indicates a problem with at least one of the component to be tested 106 and test device 116 that needs to be corrected before the component to be tested 106 and the test device 116 can advance on the assembly line.

Figure 5:
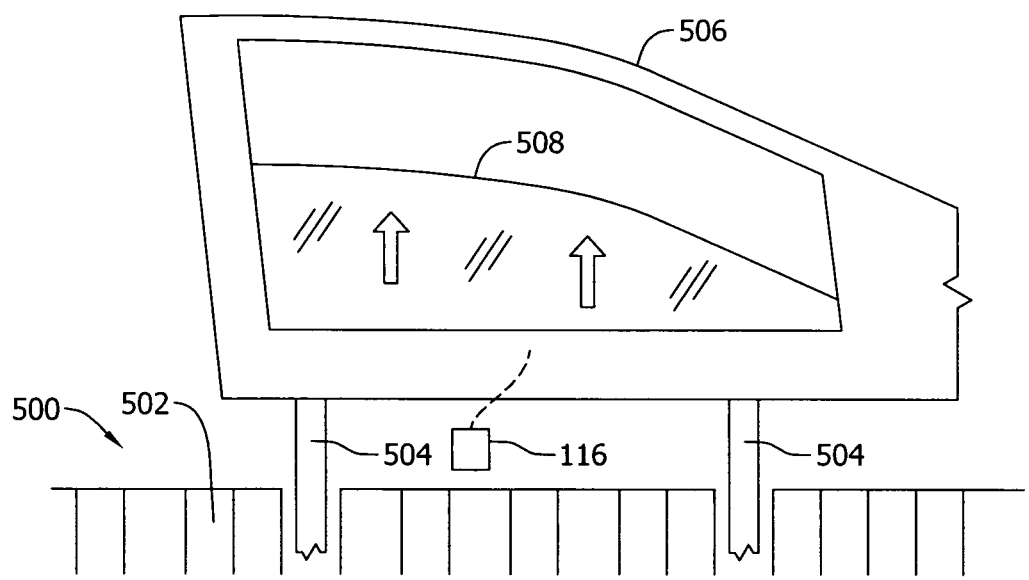

FIG. 5 is a perspective view of a portion of an assembly line 500 that may include a conveyor 502 configured to transport an assembly stand 504 between assembly stations. In the example embodiment, a vehicle door 506 is supported by assembly stand 504. The test device 116 is illustrated actuating a window 508 of vehicle door 506, which is indicated by vertical arrows as the window moving up from an open position to a closed position, which indicates a successful test. In other embodiments, the test device 116 may actuate the window 508 to move the window down from a closed position to an open position.

Figure 6:
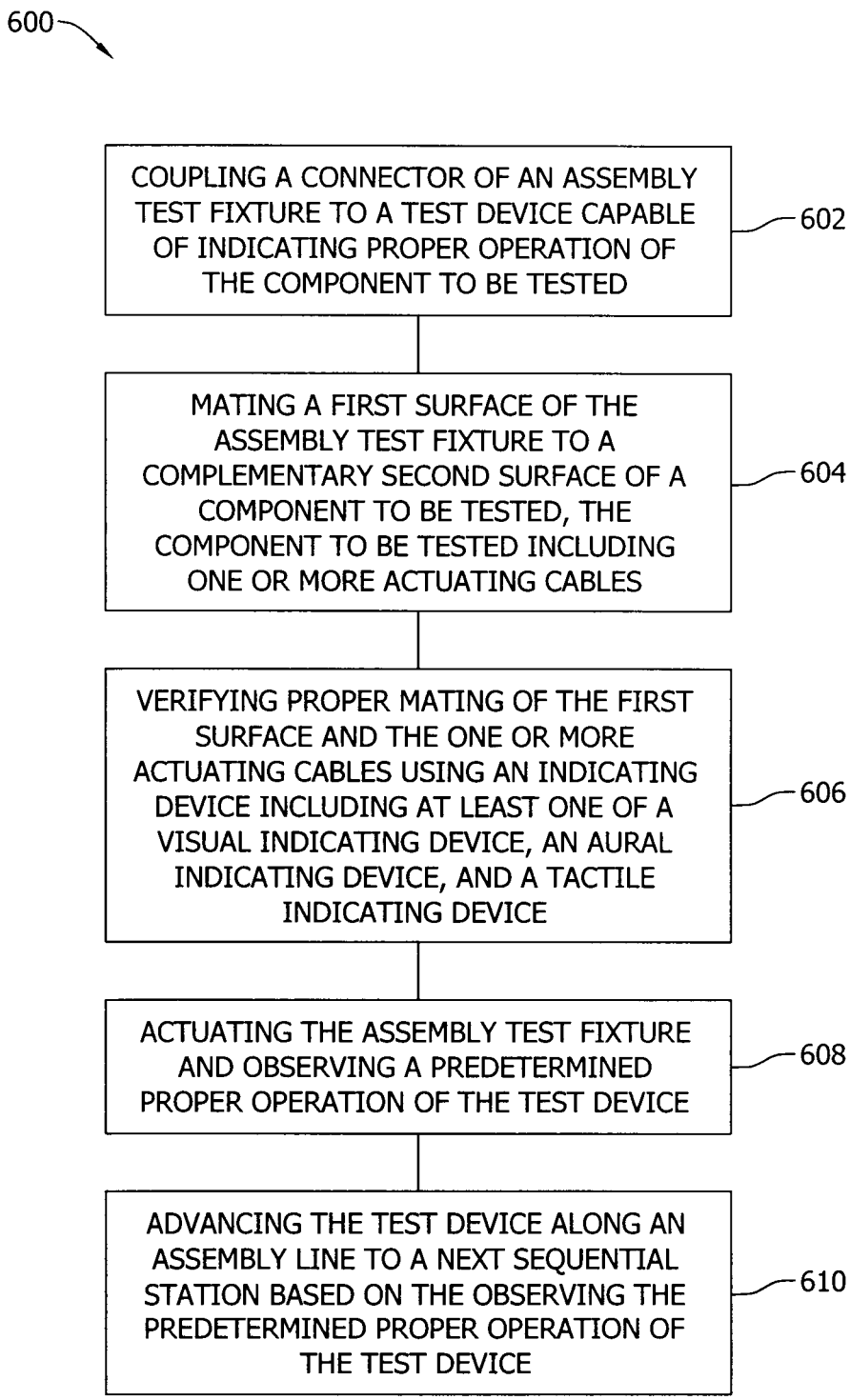

FIG. 6 is a flowchart of an example method 600 of verifying operation of a component to be tested 106. In the example embodiment, method 600 includes coupling 602 a port 132 of an assembly test fixture 100 to a test device 116 capable of indicating proper operation of component to be tested 106. In the example embodiment, coupling 602 includes coupling the port 132 of the assembly test fixture 100 to a connector 114 of a vehicle door window actuator or motor. In one particular embodiment, the test device 116 is embodied in a vehicle door window and the vehicle door window motor, and the component to be tested 106 is embodied in an inner door handle assembly and the assembly test fixture 100 is configured to operate the test device 116 when the component to be tested 106 is properly connected to assembly test fixture 100.

Method 600 also includes mating 604 a first surface 102 of an assembly test fixture 100 to a complementary second surface 104 of a component to be tested 106 by aligning a plurality of proximity detection features on the first surface with respective complementary proximity detection features on the second surface of the component to be tested and completing an electrical circuit, which indicates proper alignment of the door lock actuating cable 202 and the door handle actuating cable 204.

Method 600 also includes verifying 606 proper mating of the first surface 102 and the second surface 104 using indicating device 302, which may be embodied in an indicating device including at least one of a visual indicating device, an aural indicating device, and a tactile indicating device. Method 600 also includes actuating 608 the test device 116 by, for example, operating a switch on the assembly test fixture 100, which connects an electric motor of a vehicle door window to a battery in the assembly test fixture 100 through the switch on the assembly test fixture 100, and observing a predetermined proper operation of the test device 116. Method 600 further includes advancing 610 the component to be tested 106 along an assembly line to a next sequential station based on the observing the predetermined proper operation of the test device 116.

The foregoing detailed description illustrates embodiments of the disclosure by way of example and not by way of limitation. It is contemplated that the disclosure has general application to testing components on an assembly line and in other commercial and industrial environments. It is further contemplated that the methods and systems described herein may be incorporated into existing assembly lines, in addition to being maintained as a separate stand-alone bench-testing capability.

The above-described embodiments of a method and system of verifying the operation of a component to be tested provides a cost-effective and reliable means for using a normal circuit component, in this case the door window to monitor the operation of the component to be tested in this case, the inner door handle assembly. More specifically, the methods and systems described herein facilitate reducing the number of test devices needed to verify the proper operation of the component to be tested. In addition, the above-described methods and systems facilitate a timeliness of the testing procedure because any delay in testing may result in a slowdown in the assembly line. As a result, the methods and systems described herein facilitate verifying the operation of a component to be tested in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An assembly test fixture comprising:
   a first surface matingly complementary to a second surface of a component to be tested;
   a plurality of proximity detection features on said first surface configured to detect a predetermined proper alignment of one or more actuating cables of the component to be tested with respect to the second surface of the component to be tested; and
   a connector pluggable to a test device capable of indicating a proper assembly of the component to be tested;
   wherein said plurality of proximity detection features comprises at least one electrical contact configured to engage the one or more actuating cables to complete an electric circuit of the assembly test fixture that enables supply of power to the test device.

2. The assembly test fixture of claim 1, wherein said assembly test fixture further comprises a switch to control the supply of power to the test device, wherein operation of said switch when the electric circuit is completed actuates the test device.

3. The assembly test fixture of claim 1, wherein said plurality of proximity detection features comprises any of, pins, protrusions, sockets, and recesses configured to engage complementary proximity detection features on the second surface of the component to be tested.

4. The assembly test fixture of claim 1, wherein said plurality of proximity detection features provide for proper alignment of the first surface with respect to the second surface during the test.

5. The assembly test fixture of claim 1, wherein said plurality of proximity detection features comprises a first contact configured to engage one of the one or more actuating cables to permit a force to be applied to the one or more actuating cables.

6. The assembly test fixture of claim 5, wherein the force is configured to be applied toward the first surface, and wherein the one or more actuating cables transmit the force to said at least one electrical contact to depress said at least one electrical contact and complete said electric circuit.

7. The assembly test fixture of claim 1, further comprising a battery configured to supply power to the assembly test fixture and the test device during the test.

* * * * *